United States Patent

Richardson et al.

[19]

[11] Patent Number: 5,823,305
[45] Date of Patent: Oct. 20, 1998

[54] FLOW SENSITIVE, ACCELERATION SENSITIVE SHOCK ABSORBER

[75] Inventors: Donald G. Richardson, Sutter Creek; David A. Shirley, Pine Grove, both of Calif.

[73] Assignee: Ricor Racing & Development, L.P., Sutter Creek, Calif.

[21] Appl. No.: 396,558

[22] Filed: Mar. 1, 1995

Related U.S. Application Data

[63] Continuation-in-part of Ser. No. 958,560, Oct. 8, 1992, abandoned.

[51] Int. Cl.$^6$ .................................................. F16F 9/34
[52] U.S. Cl. .................................................. 188/275
[58] Field of Search .......................... 88/299, 275, 280, 88/282, 285, 322.15, 281

[56] References Cited

U.S. PATENT DOCUMENTS

| | | | |
|---|---|---|---|
| 1,281,079 | 10/1918 | Sears | 188/275 |
| 2,140,359 | 12/1938 | Hanna | 188/88 |
| 2,252,772 | 8/1941 | Katcher | 280/90 |
| 2,329,803 | 9/1943 | Whisler, Jr. | 188/88 |
| 3,338,347 | 8/1967 | Avner | 188/88 |
| 3,414,092 | 12/1968 | Speckhart | 188/100 |
| 4,254,849 | 3/1981 | Pohlenz | 188/275 |
| 4,854,429 | 8/1989 | Casey | 188/322.15 |
| 4,917,222 | 4/1990 | Bacaroit | 188/275 |
| 4,953,671 | 9/1990 | Imaizumi | 188/299 |
| 4,958,706 | 9/1990 | Richardson et al. | 188/319 |
| 4,997,068 | 3/1991 | Ashiba | 188/299 |
| 5,332,068 | 7/1994 | Richardson et al. | 188/275 |
| 5,462,140 | 10/1995 | Cazort et al. | 188/275 |

FOREIGN PATENT DOCUMENTS

| | | |
|---|---|---|
| 294846 | 9/1966 | Australia . |
| 1165327 | 10/1958 | France . |
| 1175195 | 3/1959 | France . |
| 1006819 | 3/1983 | Russian Federation . |
| 737486 | 9/1955 | United Kingdom . |
| 794354 | 4/1958 | United Kingdom . |
| 1593258 | 7/1981 | United Kingdom . |

*Primary Examiner*—Matthew C. Graham
*Attorney, Agent, or Firm*—Christie, Parker & Hale, LLP

[57] ABSTRACT

An acceleration sensitive shock absorber has a tubular housing and a piston assembly in the housing dividing the housing into an upper chamber and a lower chamber. The piston is connected to the wheel of a vehicle and the housing is connected to the chassis of the vehicle. Fluid can pass between the upper and lower chambers with a restricted flow rate during either extension or compression of the shock absorber. There is a first port for providing fluid flow from the lower chamber to the upper chamber upon downward acceleration of the wheel. A movable inertia valve in the piston assembly opens the first port when acceleration of the wheel of the vehicle is greater than a predetermined magnitude for increasing flow between the chambers. In addition, there is a first orifice downstream from the first port for creating hydraulic pressure which biases the inertia valve in an open position in response to fluid flow between the chambers. There is a second port or passage for providing fluid flow from the upper chamber to the lower chamber. A second orifice upstream from the second which provides hydraulic pressure to decrease the response time during compression.

51 Claims, 4 Drawing Sheets

FLOW SENSITIVE, ACCELERATION SENSITIVE SHOCK ABSORBER

This application is a continuation in part of U.S. patent application Ser. No. 07/958,560, filed Oct. 8, 1992, now abandoned, the subject matter of which is hereby incorporated by reference.

BACKGROUND

This invention relates to vehicle shock absorbers which are typically mounted between the wheels and chassis of an automobile, truck, motorcycle, etc. The invention relates to a shock absorber with damping characteristics that change depending upon the acceleration of parts of the shock absorber, most importantly, upon downward acceleration of the vehicle wheel. More specifically, it relates to the control of fluid flow for acceleration sensitivity in the shock absorber.

Hydraulic shock absorbers are universally employed in automotive vehicles. Each wheel of the vehicle is coupled to the vehicle chassis or frame by a spring so that bumps or dips in the road are not transmitted directly to the passengers or vehicle load. A spring alone, however, would still give a rough ride. Shock absorbers are therefore mounted in parallel with the springs to damp the accelerations applied to the chassis from the wheel. There is a long history of shock absorber development to obtain desired characteristics of passenger ride, comfort, handling for steering, road traction and the like.

Most shock absorbers are designed to have a certain operating characteristic or load-velocity curve which is a compromise of the characteristics desired for a variety of road conditions. The characteristics suitable for driving on relatively smooth road may, however, be inappropriate where the vehicle wheels may encounter short range bumps or dips. Such conditions are not limited to vehicles like those used on off-road terrain, but also include ordinary passenger and freight vehicles which may unexpectedly encounter chuck holes, speed bumps or foreign objects on the roadway.

Shock absorbers which respond to accelerations of a vehicle wheel are known in the art. One such method implemented in a standard cylinder piston arrangement allows dynamic adjustment of valves and orifices to control the flow of hydraulic fluid from one end of the cylinder to the other end through the piston in response to terrain defects. An acceleration sensitive mechanism in the piston assembly is described for this type of shock absorber in U.S. patent application Ser. No. 07/798,036.

Such acceleration sensitive shock absorbers have demonstrated a remarkable ability to improve the performance of vehicles equipped with such shock absorbers. For example, race cars equipped with acceleration sensitive shock absorbers regularly show decreased lap times of one or two seconds as compared with identical cars equipped with shock absorbers without acceleration sensitivity.

Even though a couple seconds reduction in lap time is very important in a race car, it is still desirable to provide additional improvement in an acceleration sensitive shock absorber. It is desirable to provide the enhanced performance with no additional parts in the shock absorber.

BRIEF SUMMARY OF THE INVENTION

There is, therefore, provided in practice of this invention according to a presently preferred embodiment an acceleration sensitive shock absorber having a tubular housing and a piston assembly in the housing, dividing the housing into an upper chamber and a lower chamber. The shock absorber is connected at one end to the chassis of a vehicle and the other end to a wheel of the vehicle. Fluid can pass between the upper and lower chambers with a restricted flow rate during either extension or compression of the shock absorber. There is a first port for increasing fluid flow between the chambers and a moveable inertia valve for opening the first port when the downward acceleration of the vehicle wheel is greater than a predetermined magnitude.

In addition, the acceleration sensitive shock absorber has means for biasing the inertia valve towards its open position in response to fluid flow from the lower chamber to the upper chamber. The acceleration sensitive shock absorber further provides a means for closing the first port with the inertia valve as soon as the flow in the first port ceases.

In a preferred embodiment, the inertia valve is mounted in the piston assembly for normally keeping the first port closed and opening the port upon extension of the shock absorber, i.e., acceleration of the vehicle wheel downwardly. The first port is kept open by having a first orifice downstream from the first port which has a flow area smaller than the flow area of the first port when the first port is open. The first port is closed by having a lip formed with the inertia valve that extends into the second port whereby a downward force is exerted on the inertia valve during fluid flow from the upper chamber to the lower chamber. The magnitude of downward pressure is further enhanced by an upstream orifice which has a flow area smaller than the second port.

In another embodiment for a single tube shock absorber, the inertial mass is mounted in the piston assembly for normally keeping the port closed and opening the port upon extension of the shock absorber, i.e., acceleration of the vehicle wheel downwardly. The port is kept open by having an orifice downstream from the port which has a slower rate of opening than the port when the port is partly open.

In an embodiment for a twin tube shock absorber, a sleeve-like inertial mass is mounted in a fluid reservoir surrounding the chambers for normally keeping a port between one of the chambers and the reservoir closed and opening the port upon acceleration of the vehicle wheel downwardly. The port is kept open by having an orifice downstream from the port which has a flow area smaller than the flow area of the port during at least a portion of the travel of the inertial mass between a port-open position and a port-closed position.

BRIEF DESCRIPTION OF THE DRAWINGS

These and other features and advantages of the present invention will be better understood by reference to the following detailed description when considered in connection with the accompanying drawing wherein.

DETAILED DESCRIPTION

Figure 1:
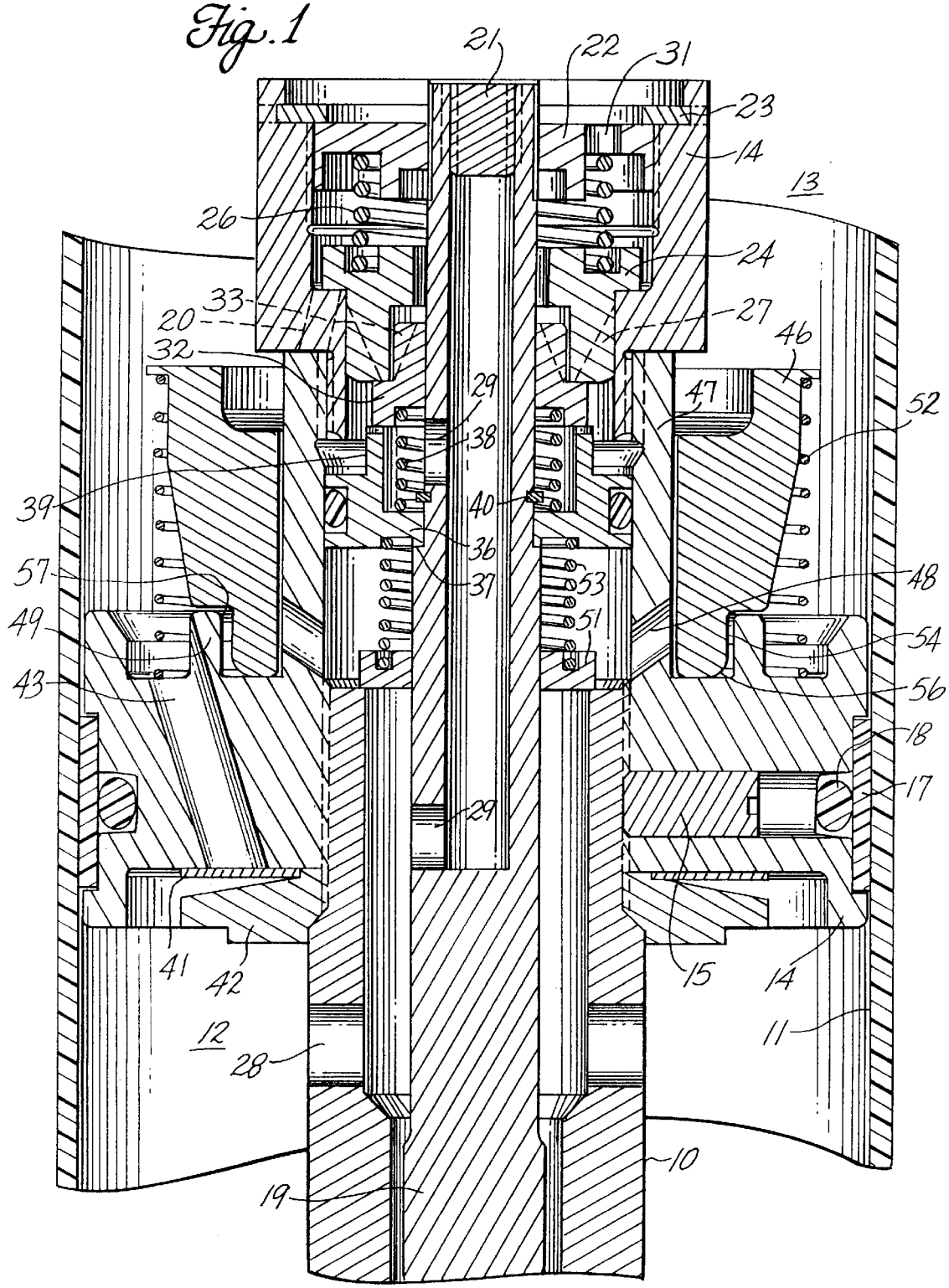
FIG. 1 illustrates in longitudinal cross-section an acceleration sensitive shock absorber constructed according to principles of this invention when there is no acceleration of the vehicle wheel.

The first two drawings illustrate a piston assembly of a single tube shock absorber which is acceleration sensitive and flow sensitive. The piston assembly is on a piston rod 10 connected to the wheel (not shown) of a vehicle. The piston assembly is mounted in the hollow cylindrical body 11 of the shock absorber, which is connected to the frame or chassis (not shown) of the vehicle. The piston assembly divides the interior of the cylinder 11 into a lower chamber 12 below the piston and an upper chamber 13 above the piston. The rest of the shock absorber, including means for connecting to the vehicle is conventional and need be illustrated for an understanding of this invention.

It will be understood that references are made to an upper chamber and a lower chamber, since this is the way the shock absorber is normally mounted in a vehicle. It may alternatively be inverted in some arrangements. When mounted as illustrated, movement of the piston assembly downwardly occurs upon extension of the shock absorber such as, for example, when the wheel moves away from the vehicle as the terrain drops away beneath the vehicle or the wheel rebounds from compression. Alternatively, upon compression of the shock absorber, the wheel and piston assembly move upwardly within the cylinder.

The piston assembly has a hollow piston 14 threaded onto the upper end of the hollow piston rod 10. A set screw 15 prevents the piston from unscrewing from the piston rod. A hollow inertia valve retainer 16 is threaded into a smaller diameter end of the piston. A set screw (not shown) in a diagonal hole 20 in the inertia valve retainer bites into the end of the piston to prevent the retainer from unscrewing from the piston. The perimeter of the piston is sealed to the inside of the cylinder by a circumferentially extending scarf-cut wear band 17 made of polytetrafluoroethylene or the like. The wear band is backed up an O-ring 18 which acts as a "spring" for biasing the wear band against the inside of the cylinder.

An adjustment rod 19 extends through the hollow piston rod and piston. The upper end of the adjustment rod is hollow and is closed by a threaded plug 21. The exterior of the upper end of the adjustment rod is hexagonal and fits in a hexagonal hole of a rebound adjuster 22 which is held in the inertia valve retainer by a snap ring 23. An annular rebound valve 24 has a larger diameter portion that seats against a shoulder inside the inertia valve retainer and is biased against the shoulder by a rebound spring 26. There are four diagonally extending slots 27 in the outside of a reduced diameter portion of the rebound valve.

During the extension or rebound of the shock absorber the piston moves downwardly in the cylinder, raising the pressure in the lower chamber and decreasing pressure in the upper chamber. This causes fluid to flow through radial openings 28 in the piston rod and additional radial openings 29 communicating with the hollow interior of the adjustment rod. The increased fluid pressure against the rebound valve 24 moves the valve upwardly against the rebound spring, moving the diagonal slots 27 past the shoulder in the retainer so that fluid can flow past the valve and through holes 31 through the rebound adjuster at the upper end of the piston assembly. It will also be noted that the changing position of the threaded rebound adjuster also changes the total travel of the rebound valve. This affects the maximum opening of the slots adjacent the shoulder and hence the flow rate of fluid through the valve.

As mentioned above, the end of the adjustment rod 19 is hexagonal and fits in a hexagonal hole in the rebound adjuster. The rebound adjuster is threaded into the inertial valve retainer. Thus, rotation of the adjustment rod can move the rebound adjuster longitudinally in the threads. This changes the force on the rebound spring and hence the opening force of the rebound valve. The adjustment rod extends through the lower end of the shock absorber for adjustment of the rebound characteristics as described in the aforementioned patent.

An annular compression valve 32 fits around the adjustment rod and has a shoulder which seats against the end of a smaller diameter portion of the rebound valve 24. A smaller diameter portion of the compression valve fits within a portion of the rebound valve. The smaller diameter portion of the compression valve has diagonally extending slots 33 on the outside surface facing toward the inside of the rebound valve. The compression valve is biased toward the closed position against the rebound valve by a compression spring 34. The other end of the compression spring bears against a compression adjuster 36 which fits onto the adjustment rod and seats against a shoulder 37. The compression adjuster is captive between that shoulder and a snap ring 40.

To adjust the opening force for the compression valve one moves the adjustment rod longitudinally. As the compression adjuster moves away from the compression valve, the force on the compression spring 34 is relaxed, reducing the opening force of the valve. Conversely, as the adjustment rod is moved upwardly toward the valve the opening force is increased.

Four longitudinal extensions 39 on the compression adjuster are positioned for engagement with the bottom of the compression valve. When the adjustment rod is in its fully up position the extensions actually bear against the end of the compression valve and prevent it from opening. This provides the maximum stiffness of the shock absorber in compression. This adjustment also changes the travel of the compression valve. When the adjustment rod is moved downwardly, the extensions are spaced away from the end of the compression valve 32 so that the valve can open. Typically, a longitudinal travel of 2.5 millimeters is appropriate for adjustment to the softest desired compression resistance. Thus, the compression adjuster sets both the compression opening force for the compression valve and the travel of the valve. The limitation on travel of the valve regulates the amount of opening of the slots 33 and meters the quantity of fluid that can flow through the compression valve.

In the event of the vehicle hitting a bump, for example, so that the shock absorber is compressed, the fluid pressure in the upper chamber 13 becomes greater than the pressure in the lower chamber. Shock absorber fluid flows through the holes 31 in the rebound adjuster, through the center hole of the rebound valve 24, through the slots 33 in the compression valve, through openings (not shown) between the extensions 39 on the compression adjuster, through the radial holes 29 in the hollow end of the adjustment rod, and through the openings 28 through the piston rod into the lower chamber.

The compression spring 34 biasing the compression valve 32 against the rebound valve 24 has a sufficient travel that it keeps the compression valve closed even when the rebound valve moves toward its open position. The pressure from the lower chamber during rebound also helps keep the compression valve closed.

The arrangement of an annular rebound valve with a compression valve coaxial and partly nested or embedded within the rebound valve provides a very compact valving arrangement for the tightly confined space in a shock absorber. In this arrangement the compression valve and rebound valve are dueling, with the compression valve biased towards opening the rebound valve. The rebound spring 26 has a higher spring constant than the compression spring 38 so that when there is no pressure differential across the piston assembly the rebound valve remains closed against the shoulder in the inertia valve retainer and the compression valve remains closed against the end of the rebound valve.

The edge of the shoulder in the inertia valve retainer cooperates with the diagonal slots 27 in the rebound valve to meter the flow through the valve during the rebound or extension stroke of the shock absorber. As the rebound valve moves away from the shoulder as pressure in the lower chamber increases, the slots progressively open and more fluid can flow through the valve. It will be apparent that the same function can be achieved with diagonal slots in the inertia valve retainer and a cooperating cylindrical surface on the outside of the rebound valve.

Similarly, the smaller diameter end of the rebound valve cooperates with the diagonal slots 33 in the compression valve to meter flow during the compression stroke of the shock absorber. When the compression valve is in its maximum nested position inside the rebound valve, the slots 33 are completely closed and no fluid flows through the valve. As the compression valve moves out of its nested position, the area of the slots through which fluid can flow progressively increases. The limitation on travel of the compression valve before encountering the extensions 39 on the compression adjuster determines the maximum flow rate of fluid and the compression stiffness of the shock absorber. If desired the slots can be provided inside the rebound valve.

The force of the compression valve on the rebound valve tending to open the rebound valve varies depending on the opening force adjustment of the compression valve. Thus, when it is desired to adjust the stiffness of the shock absorber, it is best to adjust the compression before the rebound.

It is also desirable to have a "blow off" of pressure in the event of rapid compression of the shock absorber. For this purpose there is a conventional deflected disk valve 41 held in place against the bottom of the piston by a disk retainer 42. In the event of substantially increased pressure in the upper chamber, fluid flows through diagonal passages 43 through the piston and pops the deflected disk valve open to permit direct fluid flow from the upper chamber to the lower chamber.

An important feature of the shock absorber is acceleration sensitivity. This is provided by a somewhat massive inertia valve 46 which fits closely around a smaller diameter longitudinal extension 47 of the piston. There is a close fit between the outside diameter of the piston extension and the inside diameter of the inertia valve member for minimizing fluid leakage when the valve is closed. For example, the diametral clearance is about 60 to 65 micrometers.

There are generally radially extending ports 48 through the piston extension adjacent to the inside surface of the inertia valve member 46 when it is closed as illustrated in FIG. 1. In the illustrated embodiment the ports are machined diagonally through the wall of the extension 47 to avoid interference during machining with a circumferentially extending rib 49 on the upper end of the piston. In an exemplary embodiment there are four such ports, each with an area of 20 mm$^2$, or a total flow area through the ports of 80 mm$^2$.

Figure 2:
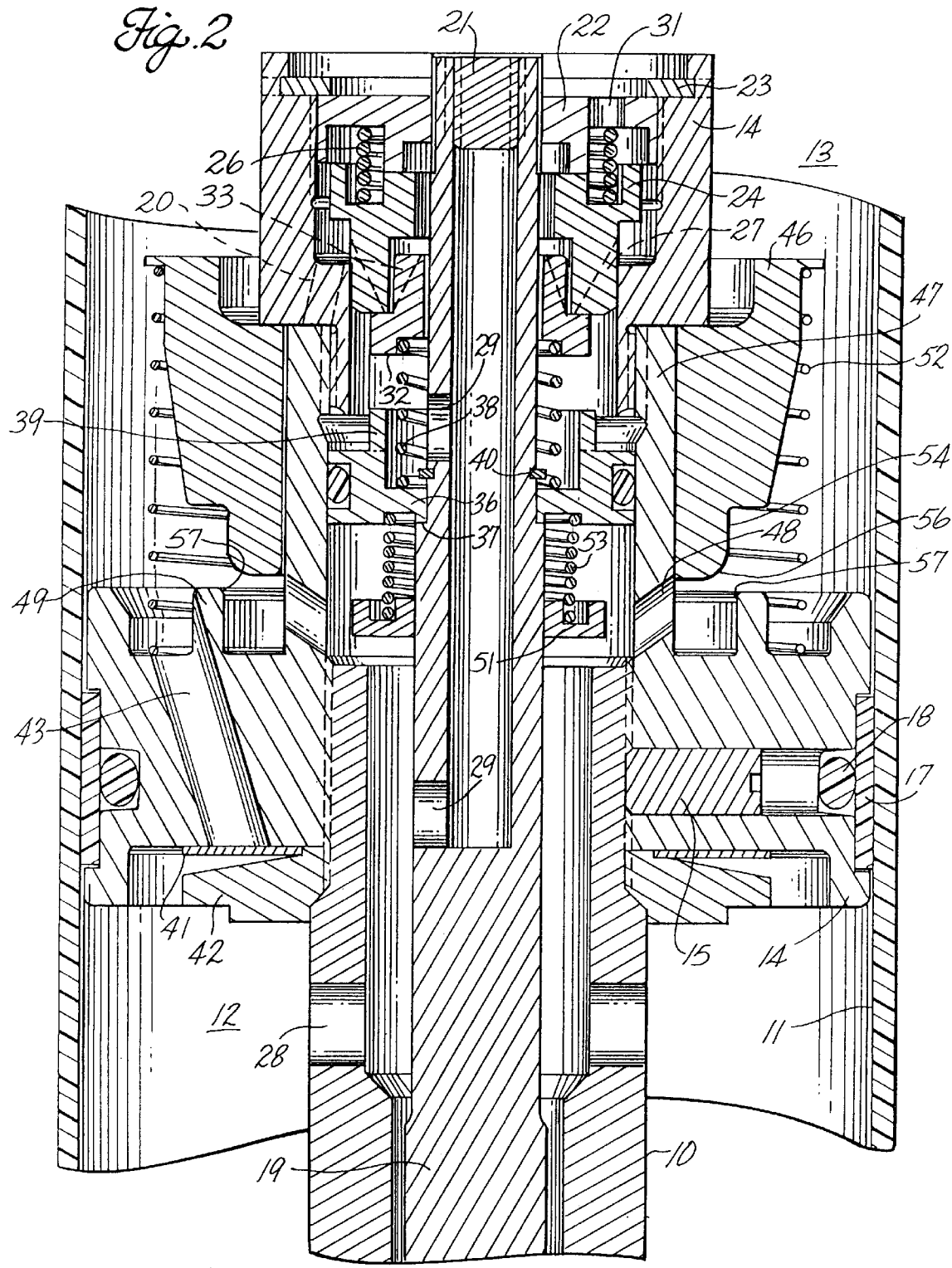
FIG. 2 is a fragmentary longitudinal cross-section of the piston assembly when the vehicle wheel is accelerating downwardly and an acceleration sensitive valve has opened.

In the event of downward acceleration of the wheel to which the piston rod is attached, the piston accelerates downwardly. Because of the inertia of the inertia valve member, it tends to remain at a fixed location in space and the piston moves away from it. Upon sufficient acceleration the inertia valve member can move upwardly (relative to the piston) until it engages the inertia valve retainer 14. When it moves to this upward or open position as illustrated in FIG. 2, the lower portion of the inertia valve member no longer obstructs the ports through the piston. Fluid from the lower chamber can therefore flow through the radial ports 28 in the hollow piston rod, through a check valve 51, and through the ports 48 into the upper chamber.

Thus, when the downward acceleration of the wheel exceeds some selected magnitude, the inertia valve is completely opened to permit relatively rapid fluid flow from the lower chamber to the upper chamber. This, of course, reduces the resistance to extension of the vehicle spring and wheel, permitting the wheel to travel downwardly rapidly and maintain engagement with the road surface.

An optional feature is a light weight spring 52 between the upper face of the piston and the inertia valve member. The spring is selected so that when the inertia valve is completely closed as illustrated in FIG. 1, the spring supports only 80 to 90% of the weight of the inertia valve member. This means that gravity closes the inertia valve against the spring force, bringing the lower end of the inertia valve member against the upper face of the piston as illustrated in FIG. 1. Also, when the spring is fully extended as illustrated in FIG. 2, with the inertia valve member against the inertia valve retainer, the spring supports from 10 to 20% of the weight of the inertia valve member. The addition of such a spring assists in promoting lift-off of the inertia valve member and promotes rapid opening of the inertia valve.

The check valve 51 is biased closed by a relatively light spring 53. The check valve permits flow from the lower chamber to the upper chamber when the ports 48 through the piston are opened by upward displacement of the inertia valve member. The check valve, however, closes quickly and prevents reverse flow in the event of compression before the inertia valve member is completely closed.

It has been found desirable to maintain the inertia valve in an open position (as illustrated in FIG. 2) even after acceleration has diminished. An orifice is therefore provided downstream from the ports 48 controlled by the inertia valve member for hydraulically biasing the inertia valve member toward its open position as fluid flows from the lower chamber to the upper chamber. As used herein, orifice refers to a hydraulic orifice or a restricted flow path rather than a hole or other mechanical equivalent. The orifice may be a portion of a flow path that has a smaller cross sectional area than another part of the flow path so that fluid flow through the orifice is restricted.

This orifice is provided by a small annular clearance between the inside diameter of the rib 49 and the circumferential outside surface 54 on the inertia valve member. When the inertia valve is completely closed as illustrated in FIG. 1, an exemplary clearance between the inside of the rib and the outside of the inertia valve member is as low as 0.6 millimeter. The relative areas and spacings of the ports 48 and the orifice between the rib and inertia valve member are such that the orifice has a smaller area than the ports when the ports are open, except for a short distance when the ports are almost closed.

Thus, when the inertia valve is partly or fully open, the cross-sectional area for fluid flow through the orifice is less than the cross-sectional area for fluid flow through the ports. Because of the restricted flow path downstream from the ports there is a higher pressure in the space between the piston and the inertia valve member than there is in the upper chamber 13. This hydraulic pressure differential between the lower end of the inertia valve member and its upper end biases the acceleration sensitive valve toward its open position.

The outside edge of the lower end of the inertia valve member has a radius 56, and there is a radius 57 on the inside of the top of the rib on the piston. The orifice for flow control downstream from the ports has an area controlled by the clearance between the rib and inertia valve member until near the upper end of the travel of the inertia valve member when the two radii begin to enlarge the distance between these members, and the flow area increases. Even when fully open as illustrated in FIG. 2, the flow area through the orifice between the radii 56 and 57 is less than the flow area through the ports. Conversely, when the inertia valve starts to close, the area of the orifice decreases for part of the stroke and then remains essentially constant for the rest of the stroke.

As the inertia valve member moves from its open position toward its closed position the pressure in the space between the end of the inertia valve member and the piston face increases while fluid is flowing through the ports and orifice from the lower chamber to the upper chamber. The increased pressure retards closing of the valve, thereby permitting rapid flow of fluid for a longer period.

As suggested above, the check valve 51 inhibits reverse flow in the event of compression before the inertia valve closes.

The radial clearance and the radii help determine the pressure in the space under the inertia valve member, and hence, the tendency of the valve to remain open. It has been found that making the radial clearance rather tight can make the inertia valve stay open too long. Increasing the clearance makes the inertia valve close sooner. The exemplary clearance mentioned above is suitable for an off-road race car which encounters rough terrain at high speed where rapid shock absorber performance is required. For an automobile for more customary street usage where bumps and dips are encountered at a slower pace, a smaller clearance is preferable for a slower closing inertia valve.

Adjustment features as described above are suitable for costly race cars, for example, but are probably too expensive for most production line cars. The adjustment features can be used in development work, however, to determine the appropriate parameters best suited to a selected vehicle. Those parameters can then be duplicated in fixed parameter shock absorbers for production vehicles.

Figure 3:
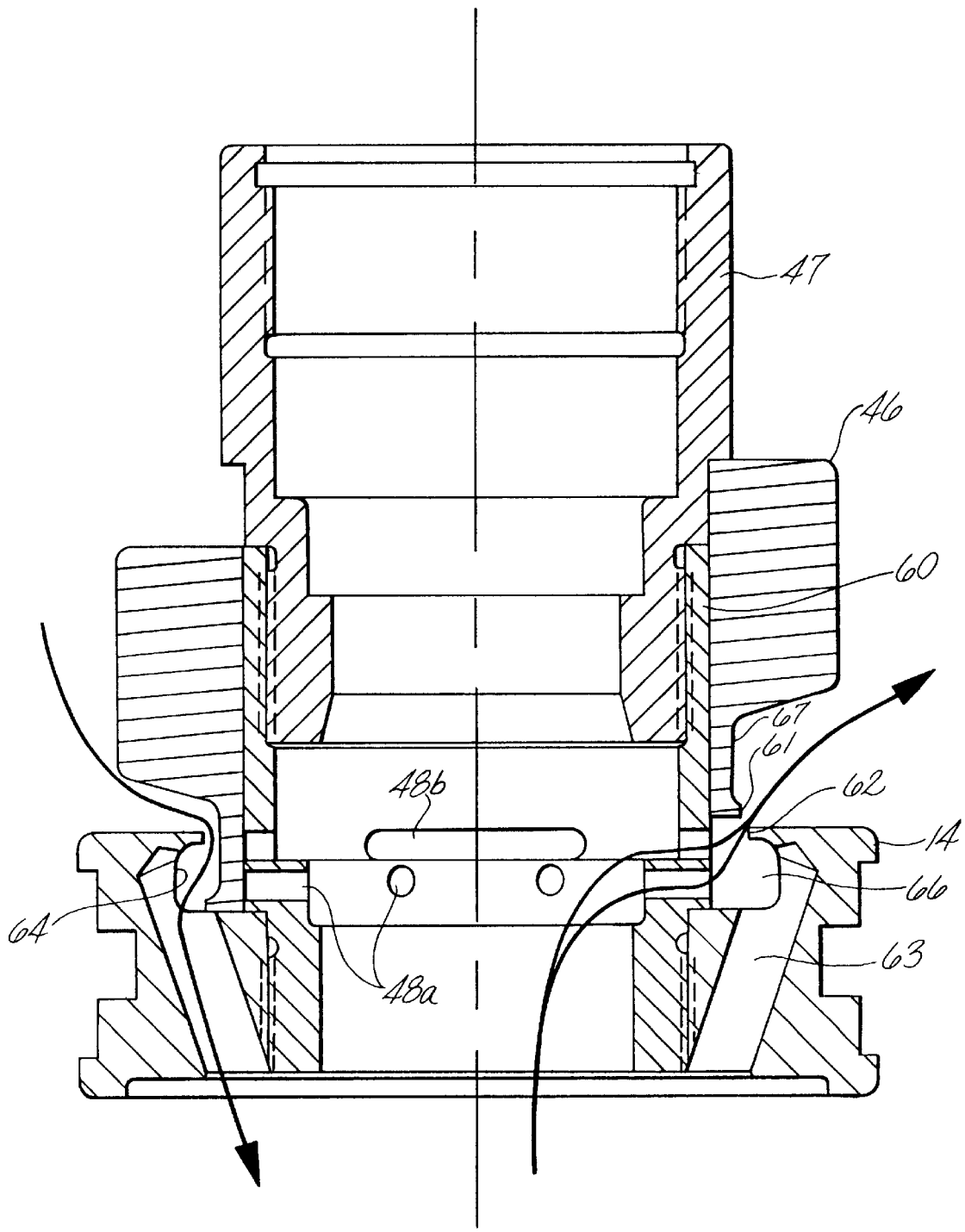
FIG. 3 illustrates in longitudinal cross-section an acceleration sensitive shock absorber constructed according to principles of this invention where the left side of the drawing depicts the shock absorber when there is no acceleration of the vehicle wheel, and the right side of the drawing depicts the shock absorber upon downward acceleration of the wheel.

FIG. 3 is a fragmentary longitudinal cross-section of the piston and inertia valve of another embodiment of acceleration sensitive, fluid flow sensitive shock absorber with includes as an additional feature, namely means for rapidly closing the inertia valve upon reverse flow occurring. A portion of the structure illustrated in FIG. 3 is the same as hereinabove described and illustrated in FIGS. 1 and 2. The same reference numerals are therefore employed to designate the parts. FIG. 3 differs from FIGS. 1 and 2 by illustrating in the left portion of the drawing the shock absorber when there is no acceleration of the vehicle wheel in the downward direction and the right side of the drawing illustrates the shock absorber upon downward acceleration of the vehicle wheel.

In this illustration, the piston rod 10 and the valving structure within the piston are deleted, since not required for an understanding of the additional structure for rapidly closing the inertia valve. The omitted structure is essentially identical to what is disclosed in FIGS. 1 and 2.

Thus, what is illustrated in FIG. 3 is the piston 14 and the upper extension sleeve 47. Instead of having the sleeve integral with the piston, there is an intermediate sleeve 60 threaded to the piston and to the longitudinally extending upper sleeve. Part of the reason for doing this is to make it easier to machine an internal structure on the larger diameter portion of the piston and the radial ports 48 for fluid flow through the piston. The inertial mass 46 mounted on the piston is also illustrated in FIG. 3. It should be noted that when assembled in the shock absorber there is a deflected disk valve (not shown in FIG. 3) on the bottom face of the piston similar to the deflected disk valve 41 illustrated in FIGS. 1 and 2.

In the embodiment illustrated in FIG. 3, the hydraulic orifice or restricted fluid flow path downstream from the fluid ports 48 is provided by a small annular clearance between the bottom edge 61 of the inertial mass 49 and a shoulder portion 62 on the piston 49, when the inertia valve is open. The relative areas and spacings of the ports 48 and the annular orifice are such that the orifice has a smaller area than the ports when the inertia valve is open. Thus, when the inertia valve is open, the cross-sectional area for fluid flow through the orifice is less than the cross-sectional area for fluid flow through the ports.

Because of this restricted flow path downstream from the ports there is a higher pressure below the inertia valve member 46 than there is in the upper chamber 13. This hydraulic pressure differential due to the orifice biases the acceleration sensitive valve member 46 toward its open position. This upward bias continues as long as there is fluid flow, even after acceleration has concluded.

When the inertial mass is moved upwardly relative to the piston due to acceleration, and is retained in its uppermost position by fluid flow, the lower edge 61 of the inertial mass is above the shoulder 62 on the piston and the cross-sectional area of the flow path is larger than when the edge and shoulder are immediately adjacent each other. Thus, as the inertia valve begins to descend from its maximum upward displacement, the flow area of the orifice decreases, resulting in increased pressure below the inertial mass. Such increased pressure retards closing of the inertia valve, thereby permitting rapid flow of fluid from the lower chamber to the upper chamber for a longer period.

There are two sets of fluid flow ports 48a and 48b for fluid flow from the lower chamber into the pocket below the inertial member. Upon lower acceleration, the inertial member may be moved a small distance above the piston, opening the lower ports 48a and leaving the upper, somewhat larger ports 48b closed. There is partial bypassing of fluid through the lower ports, making the shock absorber somewhat softer. The lip 61 on the inertial member is below the shoulder 62 on the piston and fluid can follow a path through the undercut 64 in the piston, around the lip 61 and through the relief 67 in the inertial mass past the shoulder 62.

Upon larger acceleration the upper ports 48b also open and the lip and shoulder are near each other, permitting a larger volume fluid flow after the inertial member has moved most of the way to its full port-open position. There is some additional opening force near the end of the stroke of the inertial mass, which occurs only after acceleration has caused the valve to open. Duration of opening is primarily what is controlled as fluid pressure in the pocket tends to keep the valve open after acceleration has stopped. By varying the longitudinal extents and locations of the lip and shoulder, the sizes of the ports and width of the annulus between the lip and shoulder, the force on the inertial member can tailored within wide ranges to provide a suitable duration that the inertial valve remains open to obtain good shock absorber performance for a given vehicle type.

It has been found to be desirable to rapidly close the inertia valve in the event of compression before the inertia valve is completely closed. In the event of increased pressure in the upper chamber, fluid flows through diagonal passages 63 through the piston and pops the deflected disk valve (41, not shown in FIG. 3) open to permit direct fluid flow from the upper chamber to the lower chamber.

The diagonal passages do not communicate directly from the upper chamber, as described and illustrated in FIGS. 1 and 2. Instead these passages terminate in an annular internal undercut portion 64 in the piston below the shoulder. This undercut region and the lower end of the inertial mass form a pocket 66 between the ports 48 and the downstream annular orifice. Although less pronounced in the embodiment illustrated in FIGS. 1 and 2, there is such a pocket beneath the inertial mass.

It has been found that fluid in this pocket tends to retard closing of the inertia valve. Such fluid cannot flow back directly to the lower chamber because of the check valve 51 (FIGS. 1 and 2) and must pass through the flow restrictive orifice. The pocket of fluid can inhibit the return of the inertial mass to its closed position. By having the diagonal passages 63 connect between the lower chamber and the pocket, fluid can be removed rapidly from the pocket.

Furthermore, increased hydraulic pressure in the upper chamber when the inertial mass is in its elevated position and the pocket beneath the inertial mass produces a large closing force against the inertial mass, driving it towards its closed position. This force is relatively large while the lower edge of the inertial mass is adjacent the shoulder and the annular space is small. The force decreases as the inertial mass moves downwardly and fluid flows from the upper chamber to the passages 63 through an annular relief 67 above the lower lip 61 on the inertial mass. The relief permits a larger volume of fluid flow than when the orifice is small. The diversion of fluid around the lip, as well as continued higher pressure in the upper chamber, continues to bias the inertia valve towards its closed position.

Thus, the lip on the inertia valve member opposite the shoulder on the piston serves two functions. When fluid flow is upwardly, through the piston during rebound, the hydraulic pressure on the lower face of the inertial mass enhances the rate of opening. On the other hand, when the fluid flow is downwardly, the higher pressure above the inertia valve than adjacent the passages 63 accelerates the inertia valve towards its closed position. It has been found that performance is significantly enhanced by closing the inertia valve in response to reverse fluid flow.

The forces tending to bias the valve towards its closed position can be varied by changing the relative dimensions of the parts to change the dimensions of the annulus between the lip and shoulder, and of the fluid flow passages. Off-road race cars, for example, requiring rapid shock absorber response, would benefit from a smaller annular spacing. An automobile for more customary street usage, on the other hand, would benefit from a larger annular opening to provide a smoother overall ride.

If desired, a portion of the fluid may be passed from the pocket below the inertial mass to the lower chamber by way of the passages, and another portion may be passed directly from the upper chamber to the lower chamber through a parallel passage (not shown). This is an added way for adjusting the speed of closing of the valve.

It has been found that such an arrangement for quickly closing the inertia valve significantly enhances performance of the shock absorber. The valve operates so quickly that it can be heard as inertial mass strikes the adjacent parts at the end of its stroke. This noise can be minimized by placing a thin rubber buffer so as to engage each end of the inertial mass at the ends of its stroke. Even a thin cushion can noticeably reduce the noise.

The recovery feature of the inertia valve in response to compression when the inertia valve is still open results in superior damping characteristics. By terminating the flow of fluid from the lower chamber to the upper chamber in this manner, the shock absorber becomes stiff more rapidly and the overall handling capability of the vehicle is significantly improved.

Figure 4:
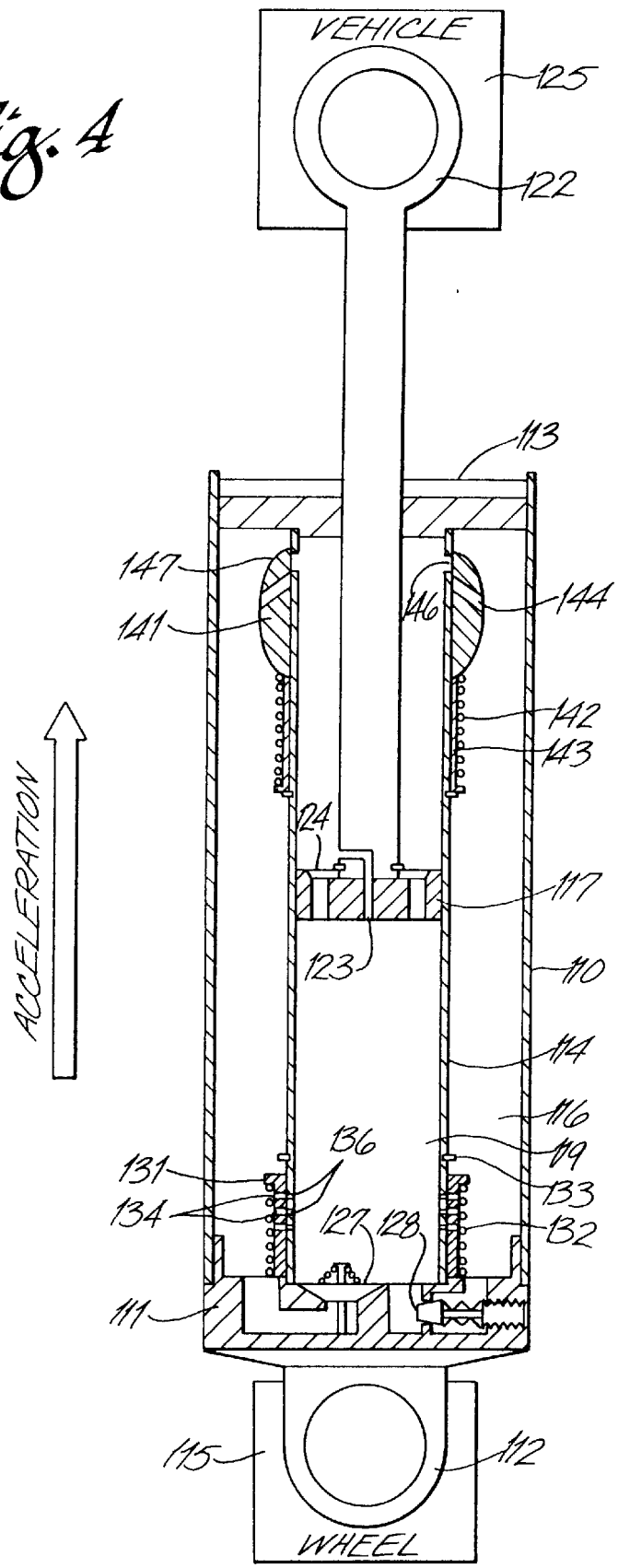
FIG. 4 is a fragmentary semi-schematic longitudinal cross-section of another embodiment of twin tube shock absorber with a flow sensitive inertial mass.

FIG. 4 illustrates the upper end of a twin tube shock absorber of the same general type as illustrated in FIG. 3. This embodiment illustrates fluid flow sensitivity employing the principle of a downstream orifice smaller than a flow port for keeping an inertia valve open for a longer period. The shock absorber has an outer tube 210 sealed at its upper end by an upper end cap 213. An inner tube 214 is also sealed to the upper end cap. This defines an annular fluid reservoir 216 between the inner and outer tubes. A movable piston 217 is sealed in the inner tube, dividing its interior into an upper chamber 218 and a lower chamber 219. The piston is connected to a shaft 221 which extends through the upper end cap and terminates in a fitting 222 which is used for bolting the shaft to a vehicle chassis 225. The piston assembly is the same as illustrated in FIG. 3.

A rebound or extension acceleration sensitive valve is provided at the upper end of the inner tube for permitting fluid flow from the upper chamber 218 into the annular reservoir 216 in the event of rapid acceleration of the wheel downwardly. An axially movable upper sleeve 241 surrounds the inner tube near its upper end. A significant portion of the weight of the upper sleeve is supported by a low spring rate coil spring 242. The sleeve serves as an inertia mass for controlling the rebound valve. The spring is sufficiently light that it will not support the entire weight of the inertia mass, but simply offsets a portion of that weight so that the inertia mass can displace more quickly.

When the sleeve is in its lower position, i.e., when there is no downward acceleration of the wheel, the bottom of the sleeve rests on a stop shoulder 243 on an inner sleeve 244. As described above, when the wheel of the vehicle encounters a dip in the terrain or passes over the top of a bump, the wheel rebounds or accelerates downwardly. Sufficiently rapid acceleration leaves the inertial mass 241 in place as the inner tube of the shock absorber accelerates downwardly. This opens the acceleration sensitive valve. When the outer sleeve 241 moves toward its upper or open position as illustrated in FIG. 4, the upper end of the sleeve clears radial ports 246 through the wall of the inner tube. When the inertial mass is in its lower position against the stop 243, the end of the sleeve covers the ports and prevents fluid flow from the upper chamber into the annular reservoir.

The inner sleeve 244 has a conical external surface which tapers from the relatively smaller diameter at the upper end toward a relatively larger diameter near the lower stop shoulder 243. The inside surface of the outer inertia mass 241 is essentially cylindrical. The relative dimensions of these parts and the angle of the taper provide an annular orifice 247 between the inner sleeve and the outer sleeve so that throughout most of the travel of the outer inertial mass the flow area through the orifice is less than the flow area through the radial ports in the inner tube.

Thus, when the valve is substantially completely open with the outer inertial mass in its uppermost position as illustrated in FIG. 4, there is a maximum flow area through both the ports and downstream orifice. Since the flow area through the orifice is smaller than the ports, the pressure in the space between the movable outer sleeve and the fixed inner sleeve is greater than the pressure in the annular reservoir. This tends to bias the inertial mass toward the open position. Furthermore, in this arrangement when the valve is, for example, one-third open and two-thirds closed, the remaining flow area through the radial ports is still larger than the annular orifice between the sleeves because of the taper.

In the illustrated embodiment the taper extends the full length of the inner sleeve so that at substantially all positions of the outer sleeve the downstream orifice has a smaller flow area than the ports. If desired, the taper may extend only part of the way along the inner sleeve and nearer the larger diameter lower end, the sleeve may become cylindrical. In such an embodiment, as valve approaches its closed position, the orifice area stops getting smaller, thereby minimizing or eliminating the pressure differential between space between the sleeves and the surrounding annular reservoir. In such an embodiment the increased pressure tends to hold the valve open when it is most of the way open and permits it to close more readily when the outer sleeve has moved most of the way towards the closed position. Small radial slots (not shown) may be provided at the stop 243 so that there is a small opening adjacent to the orifice when the valve is completely closed and the inertial mass is against the stop.

Although the inner taper is illustrated in this embodiment on a separate sleeve it will be apparent that part of the structure providing the annular orifice may be integral with the inner tube. It will also be apparent that the variable area orifice may be provided by an internal taper inside the inertial mass which moves adjacent to a shoulder on the outside of the inner tube. Other arrangements for providing a downstream orifice having an area smaller than the upstream ports will be apparent to those skilled in the art.

A flow sensitive arrangement for biasing the inertia valve open also assists in preventing "chatter" when the valve is only partly open.

Although the present invention has been described in considerable detail with reference to certain preferred embodiments thereof, it will be apparent that there may be many modifications, variations and embellishments of flow sensitive, acceleration sensitive shock absorbers. Some of the check valves may be omitted or replaced by flow restricting passages in specific embodiments. The shape of the orifices and passages may be varied or chamfers provided so that the change between stiff and soft characteristics of the shock absorber change at a controlled rate.

Furthermore, the invention has been described for an inertia valve that opens upon rebound of the shock absorber. It is apparent that the same principles may be employed in an inertia valve that opens during the compression stroke of the shock absorber. Thus, upper, lower and the like are used herein for convenience and other directions may be equivalent. Also, although the annular space between the edge of the inertia valve and the surrounding shoulder performs as a hydraulic orifice for both opening and closing the inertia valve, separate hydraulic orifices could be used. Since there are many such modifications and variations, which will be apparent to those skilled in the art, it is to be understood that the invention may be practiced, otherwise than as specifically described.

What is claimed is:

1. An acceleration sensitive shock absorber connected at one end to the chassis of a vehicle and at the other end to a wheel of the vehicle comprising:
    a tubular housing for connection to one portion of a vehicle;
    a piston assembly in the housing comprising a piston dividing the housing into an upper chamber and a lower chamber, and a piston rod for connection to another portion of the vehicle, one of said portions being the chassis of the vehicle and the other portion being a wheel of the vehicle;
    means for passing shock absorber fluid between the upper chamber and the lower chamber with a restricted flow rate during compression of the shock absorber;
    means for passing shock absorber fluid between the upper chamber and the lower chamber with a restricted flow rate during extension of the shock absorber;
    a first port for providing fluid flow from the lower chamber to the upper chamber;
    a second port for providing fluid flow from the upper chamber to the lower chamber;
    a movable inertial mass in the shock absorber for opening the first port when acceleration of the wheel of the vehicle is greater than a predetermined magnitude for increasing flow of fluid between the upper chamber and the lower chamber; and
    means for applying sufficient fluid pressure to the inertial mass for maintaining the inertial mass in a port-open position in response to fluid flow between the chambers.

2. An acceleration sensitive shock absorber as recited in claim 1 wherein the first port is through the piston assembly and the inertial mass is mounted in the piston assembly.

3. An acceleration sensitive shock absorber as recited in claim 1 wherein the means for applying fluid pressure comprises a restricted flow path downstream from the first port, the restricted flow path having a smaller area for fluid flow than the first port during at least a portion of the stroke of the inertial mass from a port-closed position to a port-open position.

4. An acceleration sensitive shock absorber as recited in claim 3 wherein the restricted flow path comprises an annular clearance between the inertial mass and a portion of the piston assembly.

5. An acceleration sensitive shock absorber as recited in claim 3 comprising a fluid pocket between the first port and the restricted flow path.

6. An acceleration sensitive shock absorber as recited in claim 5 wherein the second port is in fluid communication with the pocket for passing fluid from the upper chamber to the lower chamber.

7. An acceleration sensitive shock absorber as recited in claim 3 wherein the restricted flow path is upstream from the second port.

8. An acceleration sensitive shock absorber as recited in claim 1 further comprising a check valve in series with the first port for preventing reverse fluid flow through the first port.

9. An acceleration sensitive shock absorber as recited in claim 1 wherein the inertial mass is responsive to downward acceleration of the wheel of the vehicle.

10. An acceleration sensitive shock absorber as recited in claim 1 further comprising means for biasing the inertial mass toward a port-closed position when the fluid flow from the lower chamber to the upper chamber ceases.

11. An acceleration sensitive shock absorber as recited in claim 1 further comprising means for applying a hydraulic pressure against the inertial mass for biasing the inertial mass toward a port-closed position.

12. An acceleration sensitive shock absorber as recited in claim 1 further comprising means for applying a fluid momentum force against the inertial mass for biasing the inertial mass toward a port-closed position.

13. An acceleration sensitive shock absorber as recited in claim 1 wherein the means for applying fluid pressure comprises a restricted flow path downstream from the first port, the restricted flow path having a relatively larger fluid flow area near each end of the stroke of the inertial mass between a port-closed and a port-open position and a relatively smaller fluid flow area in a mid portion of the stroke of the inertial mass between a port-closed position and a port-open position.

14. An acceleration sensitive shock absorber comprising:
   a tube containing shock absorber fluid for connection to one portion of a vehicle;
   a piston in the tube dividing the interior of the tube into an upper chamber and a lower chamber, for connection to another portion of a vehicle; and
   inertia valve means for changing the stiffness of the shock absorber when the shock absorber is subjected to acceleration, the stiffness being greater upon lower acceleration and smaller upon higher acceleration comprising:
      a first fluid flow port adjacent one chamber; and
      a restricted flow path downstream from the port, the restricted flow path having a smaller flow area than the port for maintaining the inertia valve means open after acceleration has decreased, in response to fluid flow through the inertia valve means.

15. An acceleration sensitive shock absorber as recited in claim 14 further comprising a second fluid flow port for passing fluid in the opposite direction from fluid flow through the first port, and means responsive to fluid flow through the second port for closing the inertia valve means.

16. An acceleration sensitive shock absorber as recited in claim 14 further comprising means for applying a hydraulic pressure responsive to fluid flow for closing the inertia valve means.

17. An acceleration sensitive shock absorber as recited in claim 14 wherein the first fluid flow port is through the piston assembly and the inertia valve means comprises an inertial mass mounted in the piston assembly for opening or closing the port.

18. An acceleration sensitive shock absorber as recited in claim 17 wherein the restricted flow path comprises an annular clearance between the inertial mass and a portion of the piston assembly.

19. An acceleration sensitive shock absorber as recited in claim 14 wherein the inertial mass is responsive to downward acceleration of the wheel of the vehicle.

20. An acceleration sensitive shock absorber as recited in claim 14 wherein the shock absorber comprises an inner tube and an outer tube fixed to the inner tube with an annular fluid reservoir therebetween, the piston is within the inner tube, the port is through the wall of the inner tube, and the inertial valve means comprises an inertial mass mounted in the annular reservoir for opening or closing the port.

21. An acceleration sensitive shock absorber as recited in claim 20 wherein the restricted flow path comprises an annular clearance between the inertial mass and a portion of the inner tube.

22. An acceleration sensitive shock absorber as recited in claim 14 wherein the restricted flow path comprises an annular clearance comprising a tapered surface for changing the restricted flow path area as a function of inertia mass position.

23. An acceleration sensitive shock absorber as recited in claim 14 further comprising means for applying a fluid dynamic force for closing the inertia valve means.

24. An acceleration sensitive shock absorber as recited in claim 14 wherein the restricted flow path comprises an annular clearance between the inertial mass and an adjacent portion of the shock absorber, the annular clearance comprising an outwardly extending lip on the inertial mass and an inwardly extending shoulder on the adjacent portion of the shock absorber.

25. An acceleration sensitive shock absorber for a vehicle comprising:
   a shock absorber cylinder including means for connecting the cylinder to the body of a vehicle;
   a shock absorber piston in the cylinder dividing the cylinder into a lower chamber and an upper chamber, and including means for connecting the piston to a wheel of the vehicle;
   means for passing shock absorber fluid through the piston upon extension of the shock absorber;
   a first fluid flow port through the piston for passing fluid from the lower chamber to the upper chamber;
   a second fluid flow port through the piston for passing fluid from the upper chamber to the lower chamber;
   an inertia valve in the piston including a portion adjacent to the first port for closing the first port when the pressure in the upper chamber exceeds that in the lower chamber, and opening the first port when the acceleration of the vehicle wheel in the downward direction is greater than a selected magnitude;
   a first hydraulic means for biasing the inertia valve toward the open position when the first port is open; and
   a second hydraulic means for biasing the inertia valve toward the closed position upon compression of the shock absorber.

26. An acceleration sensitive shock absorber as recited in claim 25 wherein the first hydraulic means comprises a first orifice downstream from the first port, the first orifice having a smaller area than the first port when the first port is open whereby a higher hydraulic pressure is maintained upstream from the first orifice than downstream from the first orifice.

27. An acceleration sensitive shock absorber as recited in claim 25 wherein the second hydraulic means comprises a second orifice upstream from the second port, the second orifice having a smaller area than the upper chamber and thereby exerting a downward force on the inertia valve.

28. An acceleration sensitive shock absorber connected at one end to the chassis of a vehicle and at the other end to a wheel of the vehicle comprising:
   a tubular housing for connection to one portion of a vehicle;
   a piston assembly in the housing comprising a piston dividing the housing into an upper chamber and a lower chamber, and a piston rod for connection to another portion of the vehicle, one of said portions being the chassis of the vehicle and the other portion being a wheel of the vehicle;
   means for passing shock absorber fluid between the upper chamber and the lower chamber with a restricted flow rate during compression of the shock absorber;

means for passing shock absorber fluid between the upper chamber and the lower chamber with a restricted flow rate during extension of the shock absorber;

a first fluid flow port for flow between the upper and lower chambers;

a restricted flow path downstream from the port for flow between the upper and lower chambers; and an inertial mass movable between a port-closed position and a port-open position when acceleration of the wheel is greater than a selected magnitude, the inertial mass being arranged so that the restricted flow path has a smaller fluid flow area than the port during at least a portion of the travel of the inertial mass from the port-closed position toward the port-open position for applying a hydraulic pressure against the inertial mass for biasing the inertial mass toward a port-open position in response to fluid flow sequentially through the port and restricted flow path.

29. An acceleration sensitive shock absorber as recited in claim 28 wherein the port comprises a generally radially extending passage, the inertial mass moves between a position obstructing the passage in the port-closed position and a position exposing the passage in the port-open position, the restricted flow path comprising an annular clearance around the inertial mass through which fluid from the port must flow.

30. An acceleration sensitive shock absorber as recited in claim 28 further comprising means for hydraulically biasing the inertial mass toward a port-closed position when fluid flow is in a direction opposite to flow through the port.

31. An acceleration sensitive shock absorber as recited in claim 28 comprising a pocket between the port and the restricted flow path and a second port for passing fluid from the pocket in a direction opposite to flow through the first port.

32. An acceleration sensitive shock absorber connected at one end to the chassis of a vehicle and at the other end to a wheel of the vehicle comprising:

a tubular housing for connection to one portion of a vehicle;

a piston assembly in the housing comprising a piston dividing the housing into an upper chamber and a lower chamber, and a piston rod for connection to another portion of the vehicle, one of said portions being the chassis of the vehicle and the other portion being a wheel of the vehicle;

means for passing shock absorber fluid between the upper chamber and the lower chamber with a restricted flow rate during compression of the shock absorber;

means for passing shock absorber fluid between the upper chamber and the lower chamber with a restricted flow rate during extension of the shock absorber;

a fluid flow port for flow between the upper and lower chambers;

a restricted flow path downstream from the port for flow between the upper and lower chambers; and an inertial mass movable between a port-closed position and a port-open position when acceleration of the wheel is greater than a selected magnitude, the inertial mass being arranged so that the restricted flow path has a smaller fluid flow area than the port during at least a portion of the travel of the inertial mass from the port-closed position toward the port-open position for applying a hydraulic pressure against the inertial mass for biasing the inertial mass toward a port-open position in response to fluid flow sequentially through the port and restricted flow path, wherein the port comprises a generally radially extending passage, the inertial mass moves between a position obstructing the passage in the port-closed position and a position exposing the passage in the port-open position, and the restricted flow path comprises an annular clearance through which fluid from the port must flow between a lip on the inertial mass and an adjacent shoulder around the inertial mass, the smallest area restricted flow path being when the inertial mass is in its full port-open position.

33. An acceleration sensitive shock absorber for a vehicle comprising:

a shock absorber cylinder including means for connecting the cylinder to the body of a vehicle;

a shock absorber piston in the cylinder dividing the cylinder into a lower chamber and an upper chamber, and including means for connecting the piston to a wheel of the vehicle;

means for passing shock absorber fluid through the piston upon extension of the shock absorber;

a fluid flow port through the piston for passing fluid from the lower chamber to the upper chamber;

an inertial mass in the piston including a portion adjacent to the port for closing the port when the wheel of the vehicle is not accelerating in an extension direction, and opening the port when the acceleration of the vehicle wheel in the extension direction is greater than a selected magnitude; and hydraulic pressure means for applying hydraulic pressure on the inertial mass in response to fluid flow through the port for maintaining the inertial mass in the open position when the port is open.

34. An acceleration sensitive shock absorber as recited in claim 33 wherein the hydraulic means comprises a variable area restricted flow path downstream from the port, the restricted flow path having a smaller fluid flow area than the port when the port is partly open.

35. An acceleration sensitive shock absorber as recited in claim 33 wherein the hydraulic means comprises a variable area restricted flow path downstream from the port, the restricted flow path having its smallest fluid flow area the port is fully open.

36. An acceleration sensitive shock absorber as recited in claim 33 further comprising a check valve in series with the port for permitting flow of fluid from the lower chamber to the upper chamber and preventing flow of fluid from the upper chamber to the lower chamber.

37. An acceleration sensitive shock absorber for a vehicle comprising:

a shock absorber cylinder including means for connecting the cylinder to the body of a vehicle;

a shock absorber piston in the cylinder dividing the cylinder into a lower chamber and an upper chamber, and including means for connecting the piston to a wheel of the vehicle;

means for passing shock absorber fluid through the piston upon extension of the shock absorber;

a fluid flow port through the piston for passing fluid from the lower chamber to the upper chamber;

an inertial mass in the piston including a portion adjacent to the port for closing the port when the wheel of the vehicle is not accelerating in an extension direction, and opening the port when the acceleration of the vehicle wheel in the extension direction is greater than a selected magnitude;

a restricted flow path downstream from the port;

a pocket between the port and the restricted flow path adjacent to an end face of the inertial mass; and means for maintaining a higher hydraulic pressure in the pocket than the hydraulic pressure on the opposite end face of the inertial mass when the port is open, for applying hydraulic pressure on the inertial mass in response to fluid flow through the port for maintaining the inertial mass in the open position when the port is open.

38. An acceleration sensitive shock absorber as recited in claim 37 further comprising a second port communicating between the pocket and the lower chamber for passing fluid from the pocket to the lower chamber.

39. An acceleration sensitive shock absorber as recited in claim 38 comprising an annular clearance around the inertial mass forming the restricted flow path, the annular clearance having its smallest fluid flow area when the inertial mass is in a full port-open position.

40. An acceleration sensitive shock absorber connected between the chassis of a vehicle and a wheel of the vehicle comprising:

a hollow cylinder;

a piston assembly in the cylinder dividing the cylinder into an upper chamber and a lower chamber, the cylinder being connected to the chassis of the vehicle, and the piston assembly being connected to the wheel of the vehicle;

means for passing fluid between the upper and lower chambers upon compression and extension of the shock absorber with a restricted rate of flow;

a fluid flow port between the lower chamber and the upper chamber;

an inertial mass in the piston assembly movable axially between (a) a normally closed position for closing the port and (b) an open position for opening the port and increasing flow of fluid from the lower chamber to the upper chamber when downward acceleration of the wheel is at a rate greater than a predetermined magnitude;

means for retaining the inertial mass in the port-open position when pressure in the lower chamber is greater than pressure in the upper chamber; and hydraulic means for moving the inertial mass toward the port-closed position when pressure in the upper chamber is greater than pressure in the lower chamber.

41. An acceleration sensitive shock absorber connected between the chassis of a vehicle and a wheel of the vehicle comprising:

a hollow cylinder;

a piston assembly in the cylinder dividing the cylinder into an upper chamber and a lower chamber, the cylinder being connected to chassis of the vehicle, and the piston assembly being connected to the wheel of the vehicle;

means for passing fluid between the upper and lower chambers upon compression and extension of the shock absorber with a restricted rate of flow;

a fluid flow port between the lower chamber and the upper chamber;

an inertial mass in the piston assembly movable axially between (a) a normally closed position for closing the port and (b) an open position for opening the port and increasing flow of fluid from the lower chamber to the upper chamber when downward acceleration of the wheel is at a rate greater than a predetermined magnitude; and means for applying sufficient hydraulic pressure to the inertial mass to retain the inertial mass at least partly in the port-open position when pressure in the lower chamber is greater than pressure in the upper chamber.

42. An acceleration sensitive shock absorber as recited in claim 41 wherein the means for applying comprises a restricted flow passage between the inertial mass and a portion of the piston assembly in flow series with the port, the flow passage having a smaller area for fluid flow than the port when the port is open.

43. An acceleration sensitive shock absorber as recited in claim 41 wherein the means for applying comprises an upstream fluid flow port and a downstream restricted flow path having a variable area, the area of the downstream restricted flow path being less than the area of the port when the port is partly open.

44. An acceleration sensitive shock absorber as recited in claim 41 further comprising pressure responsive means for biasing the inertial mass toward the port-closed position when fluid pressure is greater in the upper chamber than in the lower chamber.

45. An acceleration sensitive shock absorber as recited in claim 41 comprising a pocket between the fluid flow port and the restricted flow path and a second port for passing fluid from the pocket to the lower chamber.

46. A shock absorber connected at one end to the chassis of a vehicle and at the other end to a wheel of the vehicle comprising:

a tubular housing for connection to one portion of a vehicle;

a piston assembly in the housing comprising a piston dividing the housing into an upper chamber and a lower chamber, and a piston rod for connection to another portion of the vehicle, one of said portions being the chassis of the vehicle and the other portion being a wheel of the vehicle;

compression valve means for passing shock absorber fluid between the upper chamber and the lower chamber with a restricted flow rate during compression of the shock absorber; and rebound valve means for passing shock absorber fluid between the upper chamber and the lower chamber with a restricted flow rate during extension of the shock absorber, the rebound valve means and the compression valve means comprising coaxial valve members at least partly embedded one inside the other.

47. A shock absorber as recited in claim 46 wherein one of the valve members has diagonal slots in a circumferential surface adjacent a circumferential surface of the other valve member, so that when the valve members are embedded, the slots are closed and the slots progressively open as one valve member moves away from fully embedded engagement with the other valve member.

48. A shock absorber as recited in claim 46 wherein the valve members comprise an annular rebound valve member and a compression valve member at least partly fitted within the rebound valve member and further comprising:

a shoulder in the piston assembly, the rebound valve member seating against the shoulder when the rebound valve is in its closed position; and a plurality of diagonal slots in the rebound valve member adjacent to the shoulder for blocking the slots when the rebound valve member is seated and progressively opening the slots as the rebound valve member moves away from the shoulder; and wherein the compression valve member is partially embedded within the rebound valve member, the compression valve member comprising a plurality of diagonal slots adjacent to the rebound valve member for blocking the slots when the compression valve member is embedded within the rebound valve member and progressively opening the slots as the compression valve member moves away from the embedded position.

49. A shock absorber as recited in claim 48 comprising a rebound spring biasing the rebound valve member toward the shoulder and a compression spring biasing the compression valve member toward the extension valve member.

50. A shock absorber as recited in claim 48 further comprising:

means for adjusting the opening force of the compression valve means; and means for adjusting the opening force of the rebound valve means.

51. A shock absorber as recited in claim 48 further comprising:

a port for providing fluid communication between the upper and lower chambers;

a movable inertial mass in the shock absorber for opening the port when acceleration of the wheel of the vehicle is greater than a predetermined magnitude for increasing flow of fluid between the upper chamber and the lower chamber; and means for biasing the inertial mass toward a port-open position in response to fluid flow between the chambers.

* * * * *

UNITED STATES PATENT AND TRADEMARK OFFICE
CERTIFICATE OF CORRECTION

PATENT NO.  : 5,823,305
DATED       : October 20, 1998
INVENTOR(S) : Donald G. Richardson; David A. Shirley It is certified that error appears in the above-identified patent and that said Letters Patent is hereby corrected as shown below:

Column 3, line 16, after "need" insert -- not --.
Column 3, line 40, after "backed up" insert -- by --.
Column 7, line 56, replace "with" with -- which --.
Column 9, line 6, after "member can" insert -- be --.
Column 16, line 45, after "area" insert -- when --.
Column 17, line 58, after "connected to" insert -- the --.
Column 18, line 55, after "members are" insert -- fully --.

Signed and Sealed this

Twelfth Day of October, 1999

Q. TODD DICKINSON

*Attest:*

*Attesting Officer*            Acting Commissioner of Patents and Trademarks